United States Patent

[11] 3,583,257

| [72] | Inventor | Donald W. Peterson<br>Fenton, Mich. |
|---|---|---|
| [21] | Appl. No. | 845,994 |
| [22] | Filed | July 30, 1969 |
| [45] | Patented | June 8, 1971 |
| [73] | Assignee | General Motors Corporation<br>Detroit, Mich. |

[54] MOTION CONVERTER MECHANISM FOR CONTROLS
9 Claims, 7 Drawing Figs.

[52] U.S. Cl.................................................. 74/740, 74/745
[51] Int. Cl. .................................................. F16h 37/00
[50] Field of Search............................................ 74/740, 745

[56] References Cited
UNITED STATES PATENTS

| 2,920,504 | 1/1960 | Sommer........................ | 74/745 |
| 2,932,988 | 4/1960 | Flynn et al. .................... | 74/740 |
| 3,093,008 | 6/1963 | Wight............................ | 74/745 |
| 3,313,182 | 4/1967 | Nallinger....................... | 74/740 |

*Primary Examiner*—C. J. Husar
*Attorneys*—E. W. Christen, A. M. Heiter and C. R. White ABSTRACT: A multiple ratio automatic transmission and a two-speed synchronized transmission are connected in series to provide a wide range of different speed ratios. A motion converter mechanism is used to convert a unidirectional input from a transmission control lever into a first output having cycled rotary motion for changing the automatic transmission operation from drive to neutral and back to drive to allow shifting in manual gear box under no-load conditions. The converter mechanism includes a second output which changes the manual gear ratio when the automatic transmission is in a neutral operating condition.

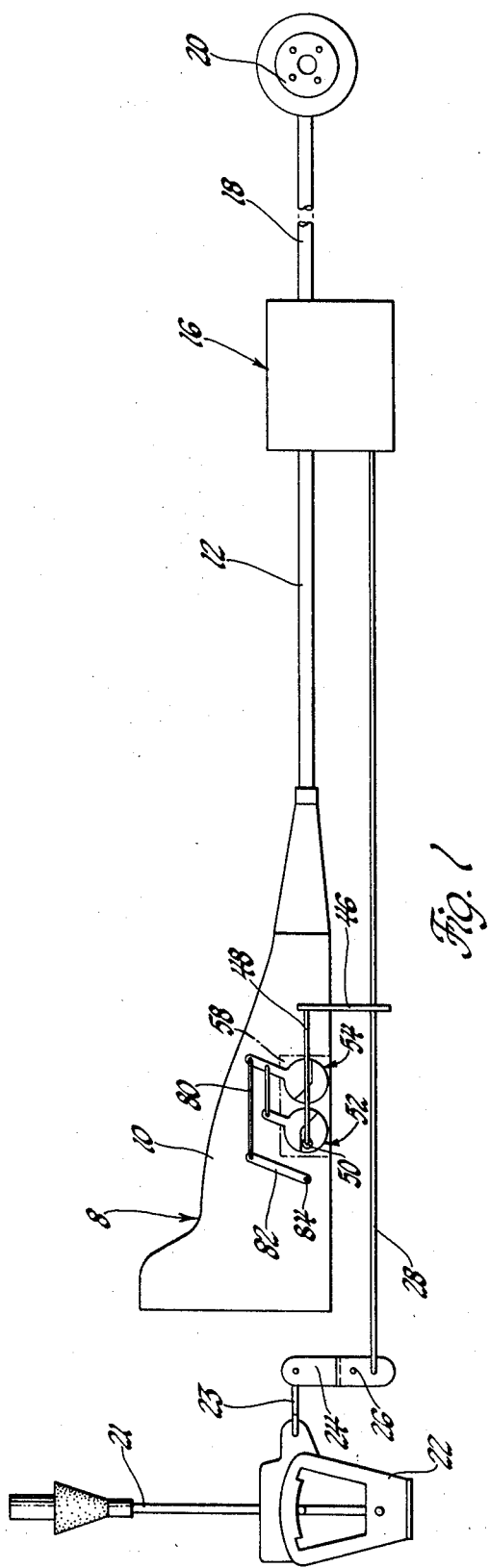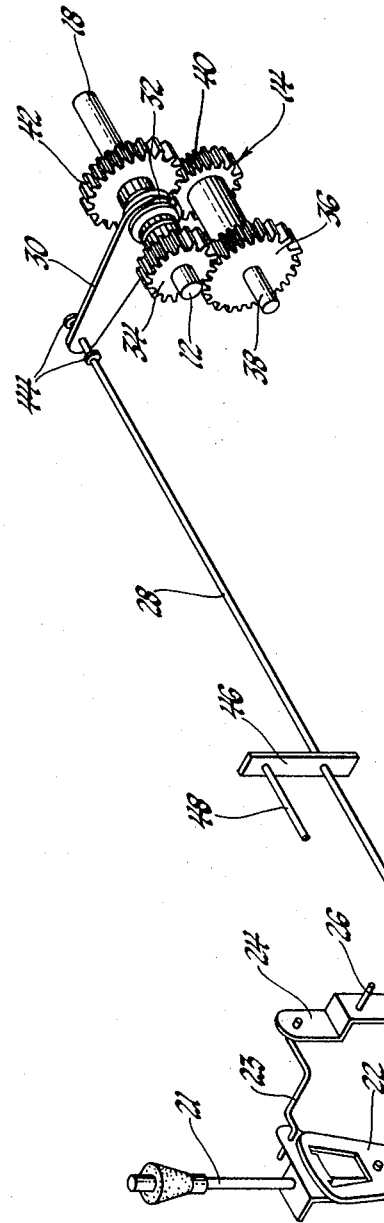

INVENTOR.
Donald W. Peterson
BY
Charles C. White
ATTORNEY

MOTION CONVERTER MECHANISM FOR CONTROLS

This invention relates to motion converter mechanisms and more particularly to a transmission control employing a mechanism that will convert unidirectional input motion into cycled rotary or linear push-pull output motion.

In the preferred embodiment of this invention a dual cam actuator is employed to operate a control valve in a multiratio automatic transmission in a cycled motion so that the automatic transmission will be sequentially conditioned for drive then neutral and then drive by one direction of movement of a single control lever. Also there is an actuator operated by the control lever for selecting predetermined ratios in a manual gear box having at least two different ratios coupled in series behind the automatic transmission. The construction is such that the automatic transmission is neutralized while the ratio is being changed in the manual gearing so that the manual gear change can be accomplished under a no-load condition. With this construction an automatic transmission and manual transmission team can be effectively and efficiently controlled making it more useful in vehicles, particularly of the hauling type such as trucks where increased torque ratios are frequently needed.

Each of these cam members has angularly disposed cam surfaces and the cam surfaces of one member are 180° out of phase with the cam surfaces on the other member. A cam actuator moving linearly across the cam surfaces of one cam member from a starting point will effect the turning of both of the cams in unison in one direction to a predetermined point. The actuator then leaves one cam and progresses to the other cam and engages the cam surfaces on the second cam to effect the turning of both of the cams in unison in a direction back to the starting point. The output mechanism for accomplishing the cycled output motion may be a link attached to either lever at a selected point thereon.

By having the input connected to a transmission control lever and the cycling output connected to hydraulic controls of the automatic transmission and a second output connected to change the drive ratio of the mechanical gearing, the automatic transmission can be neutralized while the mechanical gear ratio is being selected by using a single shift lever.

It is an object and feature of this invention to provide a motion converter mechanism which will change an input motion in one direction into a cycled rotary or linear output motion.

Another object of this invention is to provide a motion converter mechanism for changing unidirectional input motion into cycled output motion which mechanism incorporates cam devices coupled together so that an output member coupled to either one of the cams cycles as the cam actuator is moved in one direction by a control.

Another object of this invention is to provide a control for a transmission comprising an automatic transmission and a manual transmission connected in series; the control has a motion converter mechanism employed to change the transmission from drive to neutral and back to drive range as a gear change is being accomplished in the manual transmission under a no-load condition.

These and other objects of the invention will become more apparent from the following detailed description and drawings in which:

FIG. 1 is a diagrammatical view of a transmission incorporating this invention.

FIG. 2 is a perspective view of a synchronized transmission and controls.

Figure 3:
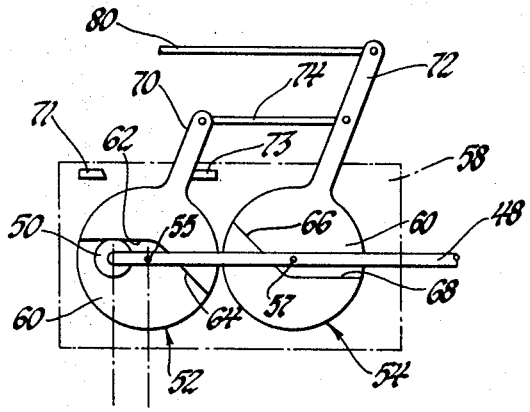
FIGS. 3 through 6 are diagrammatic views illustrating operation of the motion converter mechanism in accordance with this invention.

As shown in FIG. 1 there is diagrammatically illustrated a torque converter transmission 8 disposed in a housing 10 which drives a shaft 12. The torque converter transmission is preferably an automatic three-speed transmission such as that disclosed in U.S. Pat. No. 3,400,613 issued Sept. 10, 1968 to I. R. Johnson et al. The shaft 12 drives a two-speed synchronized gear train 14 disposed in a housing 16. This gear train has an output shaft 18 which is drivingly connected through a conventional differential to the drive wheel hubs 20. Suitable controls for selecting the operating ranges of the automatic transmission such as the controls disclosed in U.S. Pat. No. 2,905,015 issued Sept. 29, 1959 to R. J. Gorskey are preferably used with this torque converter transmission. Furthermore, the automatic transmission and synchronized gear train are controlled by a shift lever 21 movably mounted on a support bracket 22. This lever is drivingly connected by a connector 23 to a torque-transmitting lever 24 pivoted at 26 to a suitable support. The working end of the torque-transmitting lever is connected to a longitudinally extending rod 28 which extends rearwardly to the manual gear train housing 16.

As shown best by FIG. 2, the rod 28 preferably has limited sliding motion relative to a laterally projecting arm 30 with a yoke that extends into an annular groove of a shiftable synchromesh clutch collar 32 that is splined on output shaft 18. A main gear 34 is rigidly secured on the shaft 12 and this gear is in constant mesh with gear 36 of a counter shaft gear cluster mounted for rotation on counter shaft 38. This gear cluster has a low speed spur gear 40 in mesh with a spur gear 42 freely rotatable on the output shaft 18. Each of the gears 34 and 42 carries a set of circumferentially arranged external clutching teeth and one element of a synchronized friction clutch preferably in the form of a cone. These and other details of this synchronizer are known and are illustrated in the U.S. Pat. No. 2,428,892 to R. S. Plexico.

The mechanism just described provides for the selection of gear ratios in the manual gear box by operation of lever 21; by turning the lever in a clockwise direction the linkage connecting lever and arm 30 will be actuated and arm 30 will be shifted toward drive shaft 12 so that only the main gear will be clutched directly to the output shaft thereby providing one-to-one drive ratio in the gear box. If the lever 21 is turned in an opposite direction, arm 30 will be shifted to the right toward gear 42 so that only gear 42 will be clutched to the output shaft 18 and power will flow from shaft 12 to output shaft 18 through the gearing provided by gears 34, 36, 40 and 42. The pitch diameters of these gears are such that a reduction ratio is provided when the lever 21 is actuated to select a low speed.

Spaced projections 44 on rod 28 and on opposite sides of arm 30 provide a lost motion compensating device to insure that the ratio in the synchronized gear train is not selected until the transmission is conditioned for neutral. Only after predetermined travel in either direction will the arm 30 move with rod 28 by virtue of the contact of one of the projections with the arm.

Figure 7:
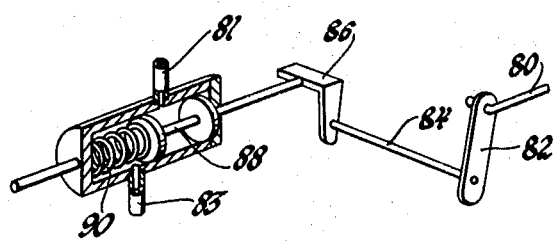
FIG. 7 is a perspective view of part of the controls for an automatic transmission and the operator mechanism for these controls.

Rod 28 has an integral side extension 46 formed thereon adjacent to the transmission housing 10 and this extension has a laterally extending operator or input bar 48 projecting therefrom. This bar has a roller 50 at its free end that operates cams 52 and 54 disposed adjacent to one another. Each of these cams is pivotally mounted by suitable pivot pins 55 and 57 for limited rotation on a suitable support within a case 58 secured to the transmission housing 10. Each cam has a cylindrical body portion that has a recessed or offset area 60 separated from the remainder of the body portion by angularly disposed camming walls or surfaces engageable by roller 50. The walls are 62 and 64 on cam 52 and corresponding walls on cam 54 are identified by reference numerals 66 and 68. Also the cams have arms or extensions 70 and 72 respectively forming parallel levers linked together by an idler link 74. The idler link is connected to the extensions by suitable pivot pins. Preferably, the cam surfaces of cam 52 face downwardly and are 180° out of phase with the upwardly facing cam surfaces on cam 54. The extending arm 72 of cam 54 has connected at its outer end an operator rod 80 that is connected to an actuator lever 82 shown in FIGS. 1 and 7. Lever 82 is rotatably supported on the transmission housing and has an extending rod 84 fixed to the lever which projects into the transmission housing. This rod is rigidly connected to an actuator 86 that operates a spool valve 88 in the hydraulic controls for the transmission. The spool valve is biased in one direction by spring 90 to a blocking position so that the automatic transmission operates in a conventional manner. When the spool valve is displaced by the actuator 86, it will move against the bias of spring 90 to a position where fluid is exhausted from the manual valve such as that described in the Johnson et al. patent through passage 81 and exhaust 83. The transmission will then be conditioned for neutral although the manual valve is in the drive range position. When the actuator 86 is returned to its initial position the spring will return the valve to a fluid blocking position whereby the transmission controls will condition the transmission for drive operation.

Figure 4:
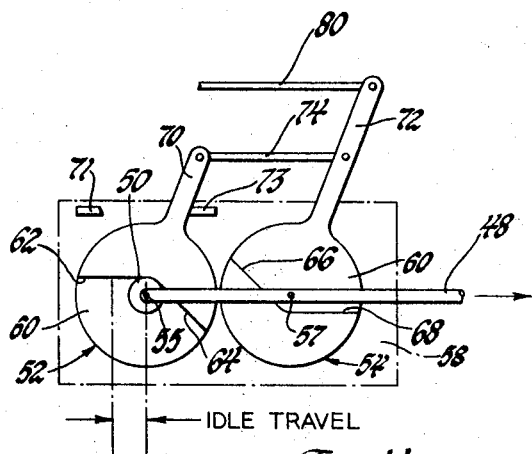
Figure 5:
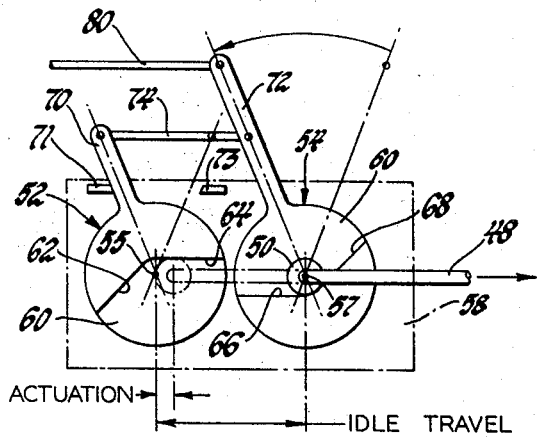

Assuming that the automatic transmission is conditioned to drive, the manual transmission is in direct drive and the vehicle is ascending a hill, torque requirements increase to a point where additional torque multiplication is desirable. When this occurs, the vehicle operator will move the control lever 21 from the high drive position to the low drive position shown in FIGS. 1 and 2. This causes the rod 28 and input bar 48 to move to the right. As the input bar 48 is thus moved, the roller reaches the center of the cam 52 and contacts both cam surfaces 62 and 64. At this time the mechanism becomes unlocked and the cams are free to rotate clockwise about their axes. As the roller continues to move to the right, it is forced against the cam surface 64 as shown in FIG. 4. Further movement of the shaft and roller in this direction forces the cam to rotate counterclockwise until the arm or lever 70 strikes the stop 71 where the cam face 64 is parallel with the axes of input bar 48 as shown in FIG. 5. While this occurs, cam 54 has also been rotated counterclockwise through operation of the link 74 and the operator rod 80 has been linearly moved to the left for its full travel. By this means the spool valve has been actuated as described above and the transmission has been placed in a neutral condition so that the manual gear train is not receiving engine torque and is thus unloaded.

Figure 6:
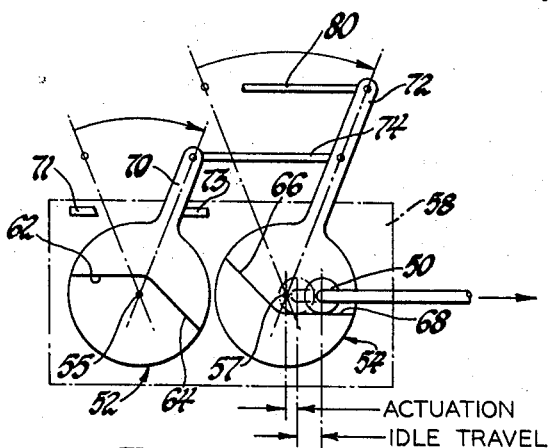

In the manual gear box the low ratio is selected when the neutralization of the automatic transmission has been accomplished. As the input continues to move to the right, the roller passes from the cam surface 64 of cam 52 to the cam surface 66 of cam 54. When the roller moves as far as the center of the cam 54 as shown in FIG. 5, the mechanism again becomes unlocked and the cams are free to rotate about their axes. At this time the inner projection 44 has just contacted arm 30 to disengage the Hi speed manual ratio and begun to engage the Lo speed ratio. As the input continues to travel to the right, the roller is forced against the inclined cam surface 68 rotating cam 54 clockwise until the cam arm 70 abuts against the stop 73 as shown in FIG. 6 making this cam surface parallel with the input bar axes. The input bar travels some idle distance to the right which moves the roller off of cam 54 center and along the cam face which locks up the mechanism; the operator rod 80 has now returned to its original position as it was in FIGS. 1 and 3 and the selection of the low ratio is complete with the automatic transmission again conditioned for drive. A movement now of the input bar to the left to its original position will reverse the above-described action and actuate the output again through its cycle to select the direct drive ratio.

With this invention operator rod 80 provides a linear push-pull type output. If desired, an oscillating rotary movement can be obtained from either cam arm 70 or 72 as illustrated by the arrows in FIGS. 5 and 6 showing a 1.5:1 ratio. Also, the synchronized gear train could be employed as a power takeoff for driving an accessory such as a shovel on a front end loader while the torque converter transmission drives the vehicle drive wheels alone. This invention can be used in other environments and is defined by the claims which follow:

What I claim is:

1. In a control for first and second power transmission units operatively connected in series and with said first transmission unit having a forward drive and neutral operation and said second transmission unit having at least two forward drive gear ratios, a movable control member for said transmission units having at least first and second operating positions, actuator means operatively connecting said control member and said second transmission unit so that movement of said control member from either one of said positions to the other one of said positions will actuate said actuator means to effect a gear ratio change in said second transmission unit, and a motion converter mechanism comprising first and second members operatively connected for simultaneous movement together and actuated by said movable control member for mechanically connecting said control member and said first transmission unit for changing said first transmission unit from forward drive operation to neutral operation and back to forward drive operation in response to the movement of said control member from one of said positions to the other so that the gear ratios in the second transmission are changed while said first transmission unit is in a neutral operation condition.

2. The control defined in claim 1 wherein said motion converter mechanism comprises first and second cam members, support means for said cam members, pivot means pivotally mounting said cam members on said support means, each of said cam members having a cam surface thereon, coupling means operatively connecting said cam members so that one of said cam members moves in response to the movement of the other of said cam members, and cam actuator means operatively connected to said control member for contacting said cam members and being movable across said cam surface of one of said cam members to effect the rotation of both of said cam members in one direction and subsequently movable across said cam surface of the other of the cam members to effect the rotation of both of said cam members in an opposite direction.

3. The control defined in claim 1 wherein said motion converter mechanism comprises first and second cam members, support means for said cam members, pivot means mounting said cam members on said support for limited rotary movement, each of said cam members having first and second cam surfaces thereon disposed at an angle with respect to each other, coupling means operatively connecting said cam members so that limited rotary movement of either one of said cam members effects limited rotary movement of the other of said cam members and, a cam actuator means having a follower movable in a path across said cam surfaces to initially effect the limited rotation of both of said cam members in one direction and the subsequent limited rotation of both of said cam members in an opposite direction.

4. The control defined in claim 3 and further comprising a transmission operator member for said first transmission unit and secured to one of said cam members to provide an output having a cycled output motion for conditioning said first transmission unit for neutral and drive range operation.

5. The control defined in claim 3, wherein the first transmission unit is an automatic transmission having an automatic forward drive operation with at least two forward drive gear ratios and having a neutral operation and wherein the second power transmitting unit is a synchronized transmission having at least two forward drive gear ratios, said movable control member for said transmission units being a transmission shift lever, means for mounting said lever for limited movement in a predetermined path, said actuator means comprising linkage means for operating said second transmission, connector means for directly coupling said cam actuator to said linkage means, and output means connecting one of said cam members to said first transmission so that said synchronized transmission and said automatic transmission are simultaneously operated by movement of said shift lever.

6. A motion converter mechanism for changing unidirectional input motion into cycled output motion comprising an actuator member for said mechanism, control means operatively connected to said actuator member for moving said actuator member in a predetermined path, a support, a plurality of cam members mounted for limited rotation on said support, each of said cam members having a cam surface thereon, connector means operatively connecting said cam members for simultaneous and limited rotation together, an output operatively connected to at least one of said cam members, and cam contact means carried by and movable with said actuator member initially engaging the cam surface of a first of said cam members for effecting the simultaneous turning movement of said cam members in a predetermined direction and for subsequently engaging the cam surface of a second of said cam members for effecting the simultaneous turning movement of said cam members in an opposite direction to effect a cycling of said output.

7. The motion converter mechanism defined in claim 6, said control means being a lever, support means for mounting said lever for limited turning movement with respect to a pivot axis, linkage means for operatively connecting said lever to said actuator member so that turning movement of said lever in one direction effects the linear movement of said actuator member in one direction and an oscillation of said cam members.

8. The motion converter mechanism defined in claim 6, said cam members comprising first and second cams, said cam surface of each of said cams comprising first and second angularly related walls which are sequentially contacted by said cam contact to effect the cycling of said cams in response to a directed linear movement of said actuator member.

9. The motion converter mechanism defined in claim 6, said control means being a lever movable between first and second stations, support means for mounting said lever for limited turning movement with respect to a pivot axis and for movement along a path including said stations, linkage means for operatively connecting said lever to said actuator so that movement of said lever from said first to said second station effects the linear movement of said actuator member in a first direction and the limited rotary cycling movement of said cam members and so that movement of said lever from said second to said first station effects the linear movement of said actuator in an opposite direction and the limited rotary cycling movement of said cam members.